(12) United States Patent
Chen

(10) Patent No.: US 12,384,211 B2
(45) Date of Patent: Aug. 12, 2025

(54) UNIVERSAL MODULARIZED COIL SPRING BUFFER

(71) Applicant: ELITE BUFFER LLC, Garden Grove, CA (US)

(72) Inventor: Jeff Chen, Irvine, CA (US)

(73) Assignee: Elite Buffer LLC, Garden Grove, CA (US)

( * ) Notice: Subject to any disclaimer, the term of this patent is extended or adjusted under 35 U.S.C. 154(b) by 469 days.

(21) Appl. No.: 17/856,890

(22) Filed: Jul. 1, 2022

(65) Prior Publication Data

US 2024/0001724 A1    Jan. 4, 2024

(51) Int. Cl.
*B60G 11/22* (2006.01)
*B60G 11/54* (2006.01)
*F16F 3/093* (2006.01)

(52) U.S. Cl.
CPC .............. *B60G 11/22* (2013.01); *B60G 11/54* (2013.01); *F16F 3/093* (2013.01); *B60G 2202/143* (2013.01); *B60G 2204/125* (2013.01); *B60G 2204/4502* (2013.01); *B60G 2206/42* (2013.01); *B60G 2206/73* (2013.01);
(Continued)

(58) Field of Classification Search
CPC .... B60G 11/54; B60G 11/22; B60G 2206/73; B60G 2204/125; B60G 2202/143; B60G 2206/42; B60G 2800/162; B60G 2204/4502; F16F 1/3735; F16F 3/093; F16F 3/0935; F16F 2224/025; F16F 2230/0041; F16F 2230/32
See application file for complete search history.

(56) References Cited

U.S. PATENT DOCUMENTS 4,690,428 A * 9/1987 Fluegge ................. B60G 11/16
                                                    280/124.141
5,213,315 A * 5/1993 Hartel ....................... F16F 3/087
                                                    267/153

(Continued)

FOREIGN PATENT DOCUMENTS

CA            2285068 A1 * 10/1998

OTHER PUBLICATIONS

British Patent No. GB 1066745 to Angus published on Apr. 26, 1967.*

(Continued)

*Primary Examiner* — Pamela Rodriguez
(74) *Attorney, Agent, or Firm* — Charles C. H. Wu; Wu & Reddy, APC

(57) ABSTRACT

A universal modular coil spring buffer having a plurality of modules arranged in a specific configuration adaptable to be inserted in the gap of a coil spring of a vehicle to prevent shocks. The plurality of modules includes a primary module and a plurality of secondary modules. The top surface and the bottom surface of the primary module includes an elongated groove configured to fix and hold the adjacent coils of the coil spring of the vehicle. The secondary module having a first module, a second module and a third module. The different configurations of the primary module and the plurality of secondary modules can be employed for different vehicles with different coil spring dimensions and based on the distance between the adjacent coils. The buffer lessens the compression to the coil spring thereby minimizing oil to leak caused from the shocks.

18 Claims, 10 Drawing Sheets

(52) U.S. Cl.
CPC .. *B60G 2800/162* (2013.01); *F16F 2224/025* (2013.01); *F16F 2230/32* (2013.01)

(56) References Cited

U.S. PATENT DOCUMENTS

| | | | | |
|---|---|---|---|---|
| 5,722,645 | A | * | 3/1998 | Reitter .................. B60G 11/16 267/179 |
| 2023/0241936 | A1 | * | 8/2023 | Chen ..................... B60G 11/22 267/292 |

OTHER PUBLICATIONS

German Patent No. DE 3627714 to Gaylord published on Feb. 19, 1987.*

Chinese Patent No. CN 1924390 to Jung published on Mar. 7, 2007.*

* cited by examiner

UNIVERSAL MODULARIZED COIL SPRING BUFFER

BACKGROUND OF THE DISCLOSURE

Technical Field of the Disclosure

The present invention generally relates to a coil spring buffer installation system in vehicles and more particularly, the present disclosure relates to an apparatus related system and method for installing coil spring buffer in any vehicle type to improve longevity of vehicles from shocks.

Description of the Related Art

Transportation plays a vital role in economic growth and infrastructure of a nation. Presently transportation has improved the quality of human life from rural to urban. Of all the transportation means, road transportation is one of the cost effective and flexible modes of transport for both freight and passengers. Road transportation acts as a feeder to other means of transportation. Most people prefer either public or private road transportation to reach their destination without any hindrance. So, the roads should be maintained properly for safe and secure journey. Generally challenging roads cause vehicle damage and accidents. Also, the vehicles passing through those challenging roads should be properly equipped with all safety buffers for a secure and comfortable journey. Mostly, shock absorbers are used in conjunction with automotive suspension systems to absorb unwanted vibrations which occur during driving on challenging roads. A vehicle with shock absorber improves suspension movement and enhances stability of the vehicle. A wide variety of coil spring buffers have been developed for vehicles in order to reduce the vibration on bumpy roads thus enabling a safe, smooth and stable driving experience.

Earlier vehicle suspension systems utilize a hydraulic shock absorber that absorbs or limits excessive suspension movement in vehicles. Pneumatic and hydraulic shock absorbers have upper- and lower-cylinder compartments divided by a main piston. Solenoid valves are actuated to supply hydraulic fluid under pressure to the upper cylinder compartments and subsequently to the lower cylinder compartment when it is required to lift a vehicle's wheel. Hydraulic shock absorbers are very responsive and can react quicker than most other suspension systems. Moreover, hydraulic systems are more susceptible to fluid leaks, which could lead to vehicle damage and expensive repairs. In another approach, magnetic dampers are developed for limiting more suspension in vehicles by varying their electric current through fluid containing iron. The magnetic dampers adjust their stiffness in response to the road's conditions for a smooth driving. However, in magnetic dampers repulsive force of power magnet is quite uncontrollable and it utilizes ferrous materials which are subjected to corrosion on frequent usage.

In another approach, double acting shock absorbers are used to resist both compression and rebound holes in vehicles. These double acting shock absorbers have capability of use of highly flexible springs. However, these double acting shock absorbers generate resistance only at the rebounding stage during operation. Another approach utilizes lever type shock absorbers for better damping characteristics for longer suspension bumps. These lever type shock absorber works on the principle of pumping oil backwards and forwards between two cylinders through suitable valves set to give the required amount of restriction in each direction. However, these lever type shock absorbers have become virtually obsolete due to their non-predictable damping characteristics. Yet another approach uses coil spring rubbers that limit suspension maximum deformation quantity which alleviates the direct collision of axletree to vehicle frame thereby preventing elastic element from producing excessive distortion. However, these coil spring rubbers do not fit for all vehicle types. However, all existing coil springs, leaf springs, air springs, torsion bars or rubber block suspensions have no provision for control of the rebound forces of inertia and gravity, negative suspension loads.

Therefore, there is a need for a coil spring buffer to improve suspension and enhance stability of any vehicle type via insertion of a suitable cushioning material at the auto shock spring of the vehicle. Furthermore, such a system would be designed to enhance prolonged vehicle suspension, increase driving stability, and improve longevity of vehicle shocks. Such a system would be designed to provide a kit consisting of a plurality of modules, each module varying in height to fit the coil spring of any vehicle type or size. Moreover, such a system would be designed to achieve height adjustable features by combining one or more modules to match the coil spring space of any vehicle. The present embodiment overcomes the shortcomings in the field by accomplishing these critical objectives.

SUMMARY OF THE INVENTION

To minimize the limitations found in the prior art, and to minimize other limitations that will be apparent upon the reading of the specification, the present disclosure provides a universal modular coil spring buffer system and method for installing coil spring buffer in any vehicle type to improve longevity of vehicle shocks.

In the preferred embodiment, the universal modular coil spring buffer includes a primary module and a plurality of secondary modules arranged in a specific configuration adaptable to be inserted in the gap of a coil spring of a vehicle to prevent shocks. The plurality of secondary modules includes a first module, a second module and a third module. In this preferred embodiment, different configurations of primary module and plurality of secondary modules can be employed for different vehicles with different coil spring dimensions and based on the distance between the adjacent coils. The different configurations provide different height dimensions. In this preferred embodiment, the structure of the primary module and the plurality of secondary modules are designed to allow the modules to be connected by sliding the matching pieces which lock into place thereby preventing the modules from moving while the vehicle is in motion. The primary module and the plurality of secondary modules in this preferred embodiment being a quarter circle size for easy installation thereby increasing the height of the vehicle to prevent the suspension from hitting down when the vehicle hits a bump on the road.

The primary module of this preferred embodiment is substantially semicircular in shape having an inner surface, an outer surface, a top surface and a bottom surface. The top surface of the primary module includes a top elongated groove configured to fix and hold the adjacent coils of the coil spring of the vehicle. The bottom surface of the primary module includes a bottom elongated groove configured to fix and hold the plurality of secondary modules depending on the height dimensions of the vehicle. In this preferred embodiment, the primary module can be positioned between the adjacent coils of the coil spring such that the elongated grooves snugly hold therebetween and minimizes the shock in the coil spring when the vehicle hits a bump on the road.

In this preferred embodiment, each of the plurality of secondary modules are substantially semicircular in shape having a secondary inner surface, a secondary outer surface, a secondary top surface and a secondary bottom surface. In this preferred embodiment, the first module of the plurality of secondary modules includes an elongated slot on the secondary bottom surface and an elongated projection on the secondary top surface. The second module of the plurality of secondary modules includes an elongated slot on the secondary bottom surface and an elongated projection on the secondary top surface. The third module of the plurality of secondary modules of the universal modular coil spring buffer includes an elongated slot on the secondary bottom surface and an elongated projection on the secondary top surface.

In this preferred embodiment, the length and breadth of the primary module and the plurality of secondary modules are the same, whereas the height of the primary module and each of the plurality of secondary modules are different. In one aspect of the embodiment, the height of the primary module is 0.2" and the height of the first module, the second module and the third module are 1.1", 0.63" and 0.31" respectively. Also, in this preferred embodiment, a vehicle owner initially determines the measurement of the spring spacing between the coils of their vehicle. Using this measurement, combination of modules needed to fit their vehicle is determined thereby minimizing the shock in the coil spring when the vehicle hits the bump on the road. Also, the buffer lessens the compression to the coil spring which thereby minimizes oil leakage caused from the shocks.

In the preferred embodiment, a process for installing the universal modular coil spring buffer between the adjacent coils of a coil spring of a vehicle is explained. Initially measure the spring spacing between adjacent coils of the coil spring of the vehicle. After measuring, determine an appropriate configuration of the primary module and the plurality of secondary modules based on the measured spring space. Next step is to install the primary module to the top coil between which the universal modular coil spring buffer is to be inserted. Thereafter, place the other plurality of secondary modules on the bottom side of the spring. Next, slide at least one of the plurality of secondary modules based on the appropriate configuration under the bottom surface of the primary module and to the adjacent coil of the coil spring such that the configuration of the primary module and the plurality of secondary modules are held tightly between the adjacent coils of the spring coil. Also, sliding is done in different directions among the modules to connect them together and line up on the edges in accordance with the preferred embodiment of the present invention.

In this present embodiment, a method for installing the universal modular coil spring buffer between the adjacent coils of a coil spring of a vehicle is disclosed. The method commences by providing a universal modular coil spring buffer having a primary module and a plurality of secondary modules. Next, measure the spring spacing between adjacent coils of the coil spring of the vehicle. Thereafter, determine an appropriate configuration of the primary module and the plurality of secondary modules based on the measured spring space. Next, install the primary module to the top coil between which the universal modular coil spring buffer is to be inserted and finally, sliding at least one of the plurality of secondary modules based on the appropriate configuration under the bottom surface of the primary module and above the adjacent coil of the coil spring such that the configuration of the primary module and the plurality of secondary modules are held tightly between the adjacent coils of the spring coil.

It is a first objective of the present invention to provide a coil spring buffer to improve suspension and enhance stability of the vehicle via insertion of a suitable cushioning material, including but not limited to natural rubber, synthetic rubber, composite rubber, etc, at the auto shock spring of the vehicle.

A second objective of the present invention is to enhance prolong vehicle suspension, increase driving stability, and improve longevity of vehicle shocks.

A third objective of the present invention is to provide a universal kit consisting of a plurality of modules, each module varying in height to fit to the coil spring of any vehicle type or size.

A fourth objective of the present invention is to achieve height adjustable features by combining one or more modules to match the coil spring space of any vehicle.

Another objective of the present invention is to reduce the compression to the coil spring thereby minimizing oil leak caused from the shocks.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
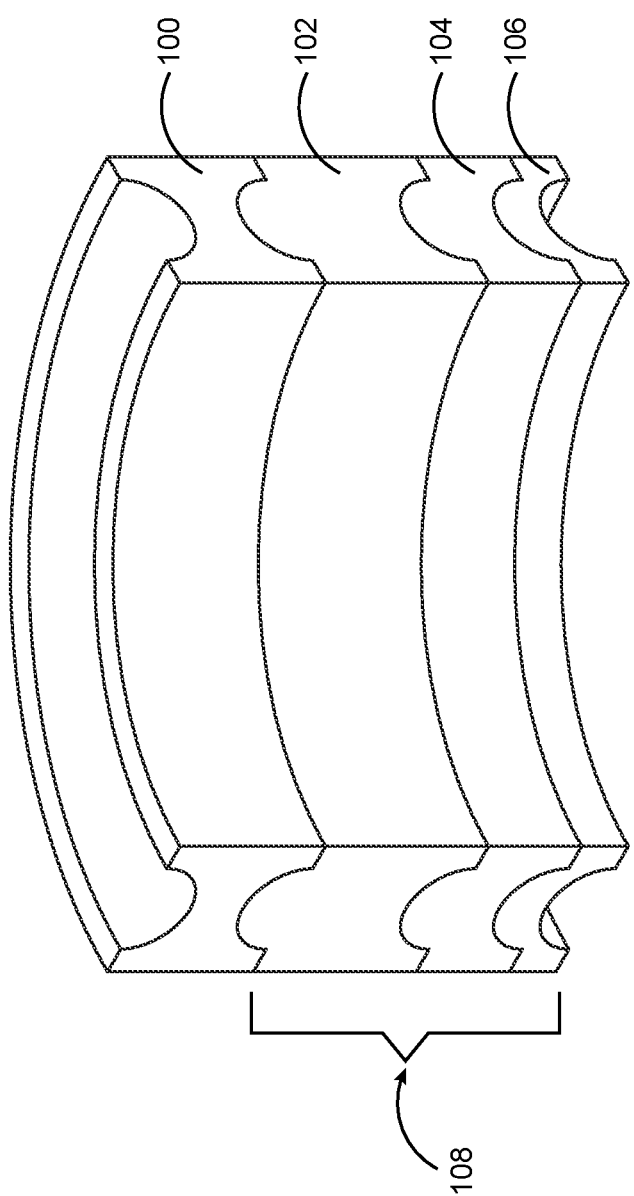
FIG. 1 illustrates a perspective view of a universal modular coil spring buffer having a plurality of modules including a primary module and a plurality of secondary modules arranged in a specific configuration adaptable to be inserted in the gap of the coil spring of a vehicle to prevent shocks in accordance with the preferred embodiment of the present invention.

Referring to FIG. 1, a universal modular coil spring buffer having a plurality of modules of the preferred embodiment is illustrated. The universal modular coil spring buffer includes a primary module 100 and a plurality of secondary modules 108 arranged in a specific configuration adaptable to be inserted in the gap of a coil spring of a vehicle to prevent shocks in accordance with the preferred embodiment of the present invention. The plurality of secondary modules 108 includes a first module 102, a second module 104 and a third module 106. In the preferred embodiment, different configurations of primary module 100 and plurality of secondary modules 108 can be employed for different vehicles with different coil spring dimensions and based on the distance between the adjacent coils. The different configurations provide different height dimensions. In the preferred embodiment, the structure of the primary module 100 and the plurality of secondary modules 108 are designed to lock into place thereby preventing the modules from moving while the vehicle is in motion. In the preferred embodiment, the modules are connected by sliding the matching pieces into place. However, other embodiments may use a different design for connecting the modules. The primary module 100 and the plurality of secondary modules 108 in this preferred embodiment being a quarter circle size for easy installation. However, the module size can also be a half circle or full circle, or any shape, size or thickness compatible with a coil spring. In an alternate embodiment of the present invention, four quarter circle modules of the same height are inserted in the coil spring gap to have a full circle installation thereby increasing the height of the vehicle to prevent the suspension from hitting down when the vehicle hits a bump on the road.

Figure 2:
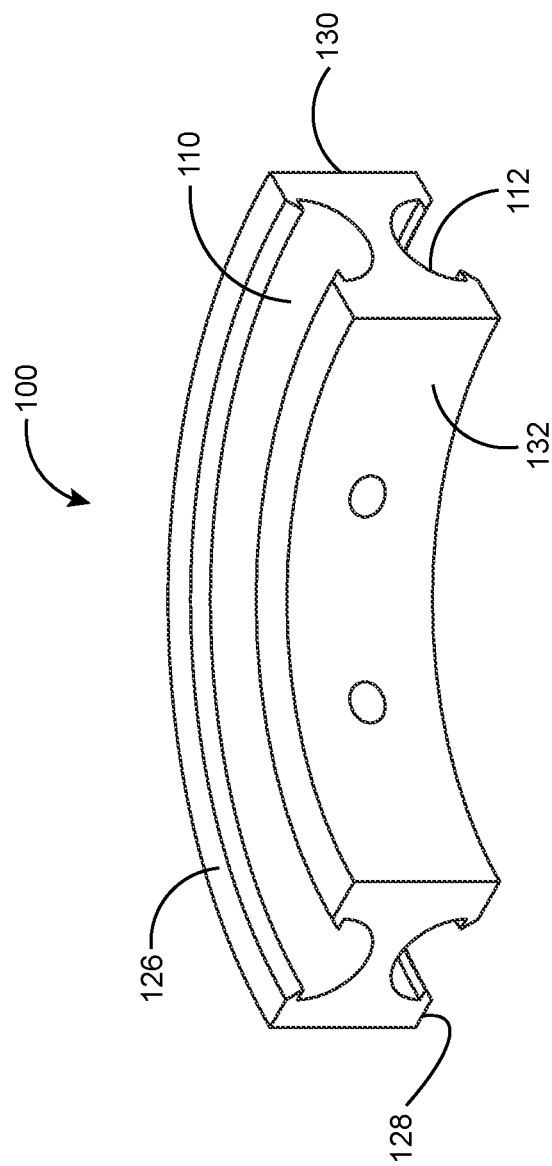
FIG. 2 illustrates a perspective view of the primary module configured to fix and hold the plurality of secondary modules in accordance with the preferred embodiment of the present invention.

Referring to FIG. 2, the primary module 100 of the universal modular coil spring buffer of the preferred embodiment is illustrated. In this preferred embodiment, the primary module 100 is substantially semicircular in shape having an inner surface 132, an outer surface 130, a top surface 126 and a bottom surface 128. The top surface 126 of the primary module 100 includes a top elongated groove 110 configured to fix and hold the adjacent coils of the coil spring of the vehicle. The bottom surface 128 of the primary module 100 includes a bottom elongated groove 112 configured to fix and hold the plurality of secondary modules 108 depending on the height dimensions of the vehicle. In the preferred embodiment, the primary module 100 can be positioned between the adjacent coils of the coil spring such that the elongated grooves 110 snugly hold therebetween and minimizes the shock in the coil spring when the vehicle hits a bump on the road.

Figure 3:
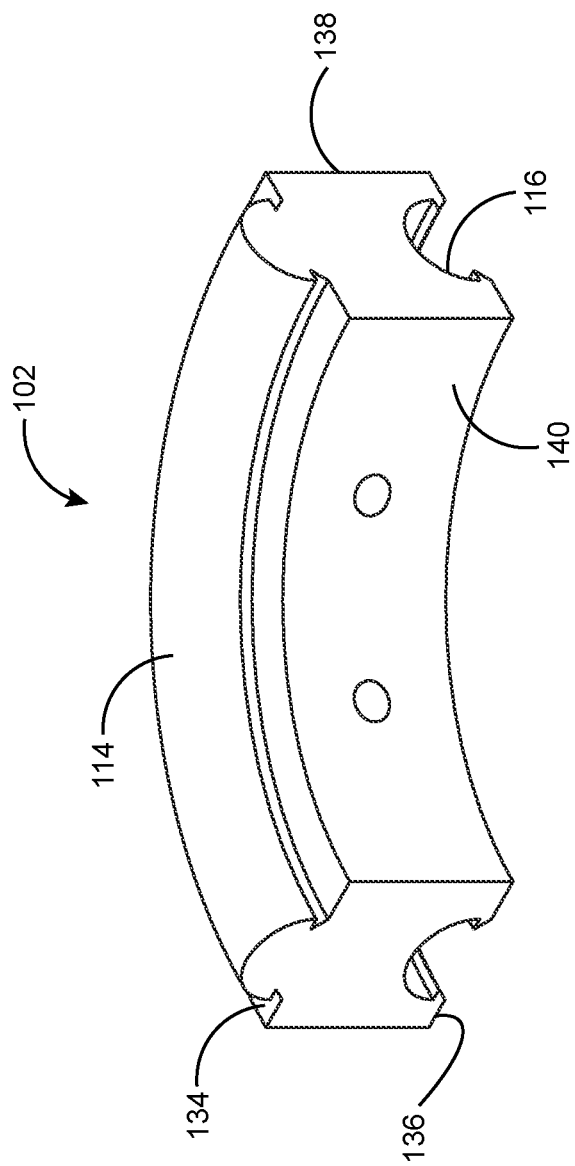
FIG. 3 illustrates a perspective view of a first module of the plurality of secondary modules in accordance with the preferred embodiment of the present invention.
Figure 4:
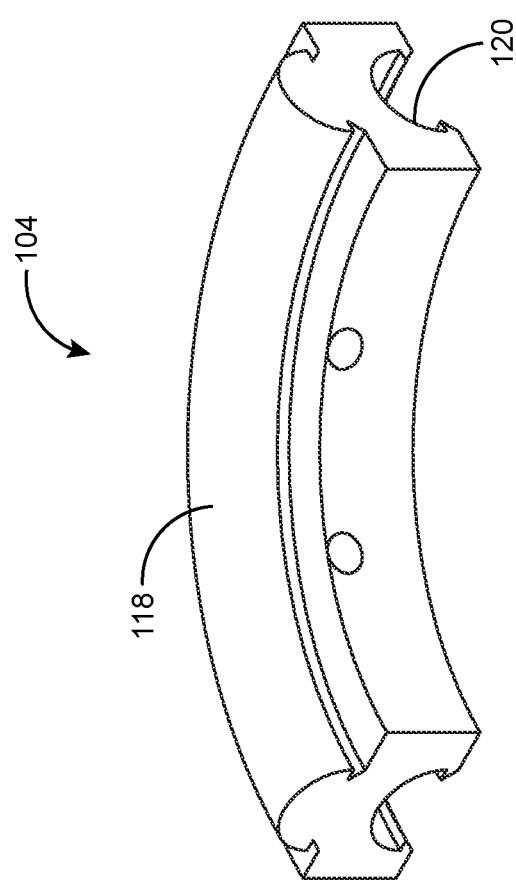
FIG. 4 illustrates a perspective view of a second module of the plurality of secondary modules in accordance with the preferred embodiment of the present invention.
Figure 5:
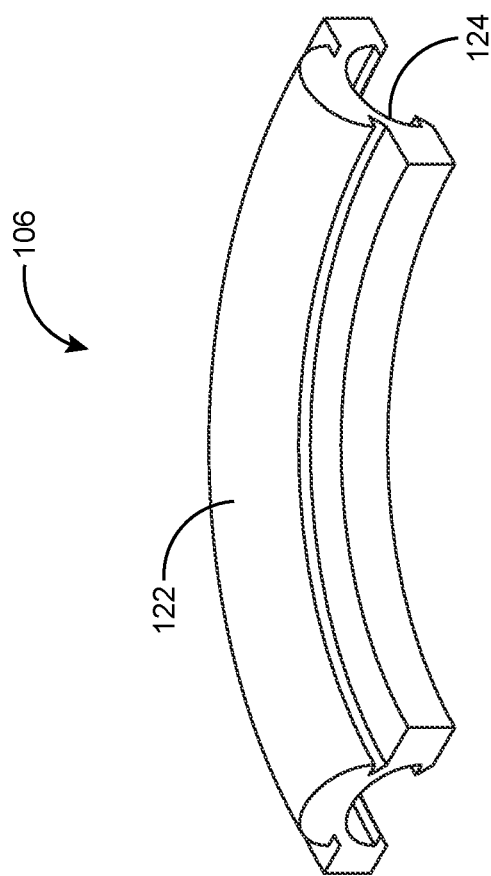
FIG. 5 illustrates a perspective view of a third module of the plurality of secondary modules in accordance with the preferred embodiment of the present invention.

Turning to FIGS. 3-5, the first module 102 of the plurality of secondary modules 108 of the universal modular coil spring buffer of the preferred embodiment is illustrated. In the preferred embodiment, each of the plurality of secondary modules is substantially semicircular in shape having a secondary inner surface 140, a secondary outer surface 138, a secondary top surface 134 and a secondary bottom surface 136 as shown in FIG. 3. In the preferred embodiment, in FIG. 3, the first module 102 of the plurality of secondary modules 108 includes an elongated slot 116 on the secondary bottom surface 136 and an elongated projection 114 on the secondary top surface 134. As shown in FIG. 4, the second module 104 of the plurality of secondary modules 108 includes an elongated slot 120 on the secondary bottom surface 136 and an elongated projection 118 on the secondary top surface 134 is illustrated. Referring to FIG. 5, the third module 106 of the plurality of secondary modules 108 of the universal modular coil spring buffer of the preferred embodiment is illustrated. In the preferred embodiment, the second module 106 of the plurality of secondary modules 108 includes an elongated slot 124 on the secondary bottom surface 136 and an elongated projection 122 on the secondary top surface 134 is illustrated.

In the preferred embodiment, the length and breadth of the primary module 100 and the plurality of secondary modules 108 are the same, whereas the height of the primary module 100 and each of the plurality of secondary modules 108 are different. The height of the primary module 100 is 0.2" and the height of the first module 102, the second module 104 and the third module 106 are 1.1", 0.63" and 0.31" respectively. Other height variations may be used for the modules. Also, in the preferred embodiment, the user initially determines the measurement of the spring spacing between the coils of their vehicle. Using this measurement, combination of modules needed to fit their vehicle is determined and installed, thereby minimizing the shock in the coil spring when the vehicle hits the bump on the road. Also, the buffer lessens the compression to the coil spring thereby minimizing oil to leak caused from the shocks.

Figure 6:
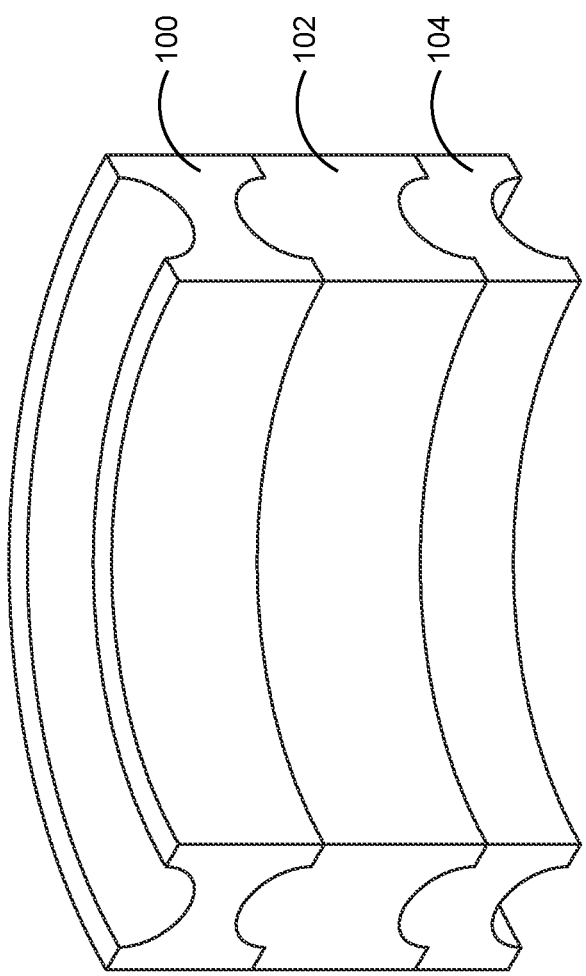
FIG. 6 illustrates a perspective view of the universal modular coil spring buffer having the primary module and combination of the first and the second module of the plurality of secondary modules in accordance with the preferred embodiment of the present invention.
Figure 7:
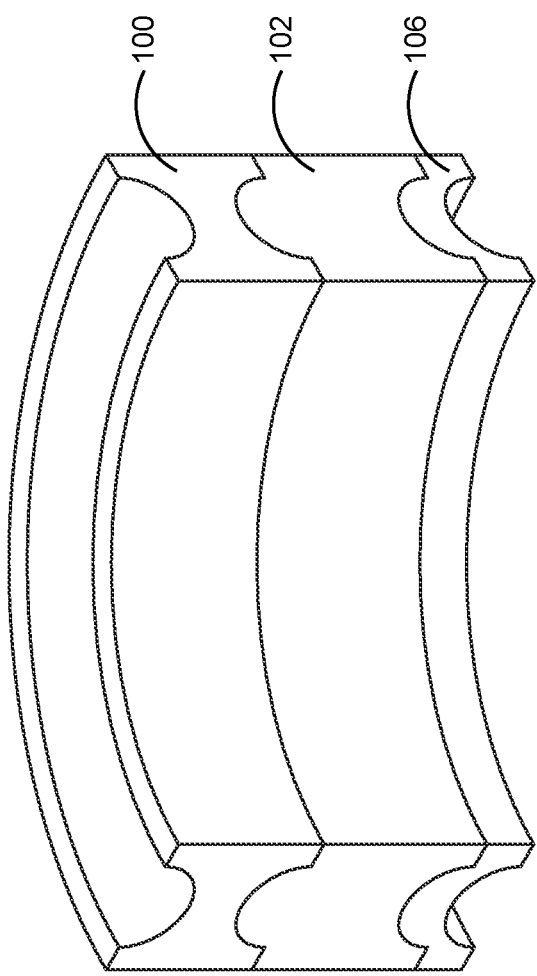
FIG. 7 illustrates a perspective view of the universal modular coil spring buffer having the primary module and combination of the first and the third modules of the plurality of secondary modules in accordance with the preferred embodiment of the present invention.
Figure 8:
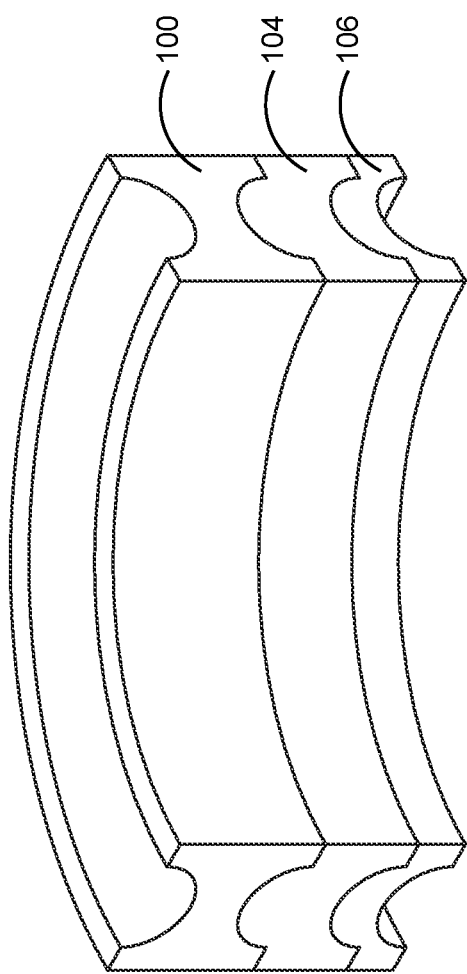
FIG. 8 illustrates a perspective view of the universal modular coil spring buffer having the primary module and combination of the second and the third modules of the plurality of secondary modules in accordance with the preferred embodiment of the present invention.

Referring to FIGS. 6-8, the primary module 100 and combination of the first module 102 and the second module 104 of the plurality of secondary module 108 of the preferred embodiment is illustrated in FIG. 6. As shown in FIG. 7, the primary module 100 and combination of first module 102 and third module 106 of the plurality of secondary modules 108 of the preferred embodiment is illustrated. Turning now to FIG. 8, the primary module 100 and combination of second module 104 and third module 106 of the plurality of secondary modules 108 in accordance with the preferred embodiment of the present invention is illustrated. In this preferred embodiment, one of the elongated projections 114 (FIG. 3), 118 (FIG. 4) and 122 (FIG. 5) on the secondary top surface 134 of each of the plurality of secondary modules 108 is adaptable to fix with the elongated groove 110 on the bottom surface 128 of the primary module 100 thereby allowing customization of the universal modular coil spring buffer in different vehicles having different coil spring space. Also, the elongated groove 110 on the top surface 126 of the primary module 100 and the elongated slot (116 (FIG. 3), 120 (FIG. 4) and 124 (FIG. 5) on the secondary bottom surface 136 of the secondary module 108 holds the adjacent coils of the coil spring of the vehicle.

Figure 9B:
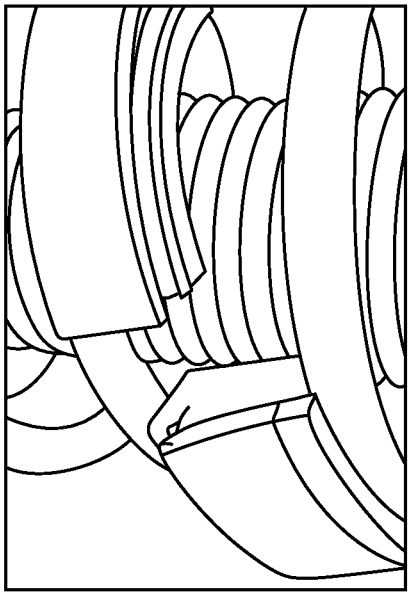
FIG. 9B illustrates the other plurality of secondary modules on the bottom side of the coil spring in the process of installing the universal modular coil spring buffer between the adjacent coils of the coil spring of the vehicle in accordance with the preferred embodiment of the present invention.
Figure 9D:
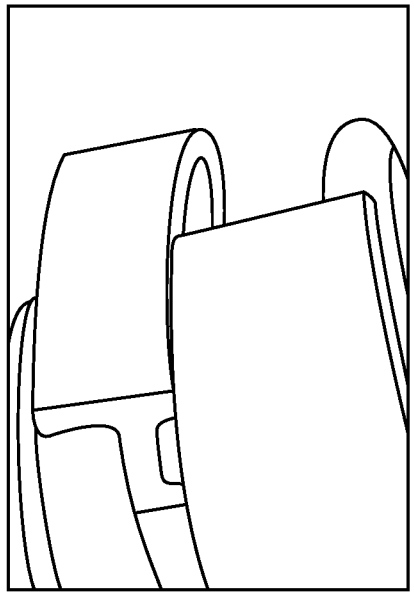
FIG. 9D illustrates the configuration of the primary module and the plurality of secondary modules held tightly between the adjacent coils of the spring coil in the process of installing the universal modular coil spring buffer between the adjacent coils of the coil spring of the vehicle in accordance with the preferred embodiment of the present invention.
Figure 9A:
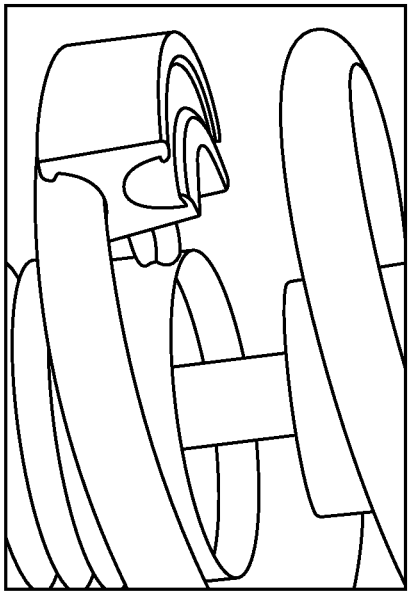
FIG. 9A illustrates the primary module on top of the coil in the process of installing the universal modular coil spring buffer between the adjacent coils of the coil spring of the vehicle in accordance with the preferred embodiment of the present invention.
Figure 9C:
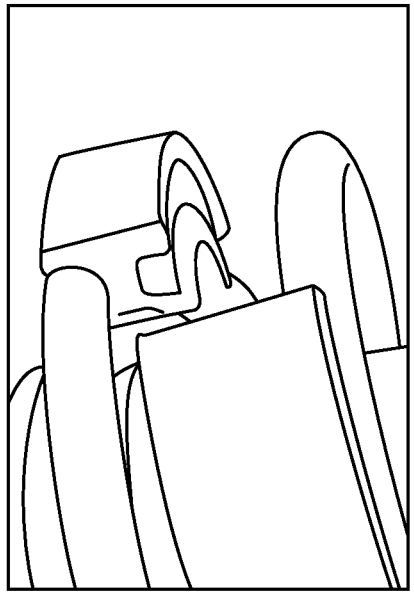
FIG. 9C illustrates sliding at least one of the plurality of secondary modules under the bottom surface of the primary module and below the adjacent coil of the coil spring in the process of installing the universal modular coil spring buffer between the adjacent coils of the coil spring of the vehicle in accordance with the preferred embodiment of the present invention.

Referring to FIGS. 9A-9D, a process for installing the universal modular coil spring buffer between the adjacent coils of a coil spring of a vehicle of the preferred embodiment is illustrated. Initially measure the spring spacing between adjacent coils of the coil spring of the vehicle. After measuring, determine an appropriate configuration of the primary module and the plurality of secondary modules based on the measured spring space. Next step is to install the primary module on top of the coil on which the universal modular coil spring buffer is to be inserted as shown in FIG. 9A. Thereafter, placing the other plurality of secondary modules on the bottom side of the spring as shown in FIG. 9B. Next, slide at least one of the plurality of secondary modules based on the appropriate configuration as shown in FIG. 9C under the bottom surface of the primary module and below the adjacent coil of the coil spring such that the configuration of the primary module and the plurality of secondary modules are held tightly between the adjacent coils of the spring coil as shown in FIG. 9D. Also, sliding is done in different directions among the modules to connect them together and line up on the edges in accordance with the preferred embodiment of the present invention. The primary module and the plurality of secondary modules of the universal coil spring buffer prevent sagging and provide more stable suspension that will absorb and dissipate the shock from potholes and bad roads while reducing stress on the suspension and tires. This increases the vehicle's operational life span.

Figure 10:
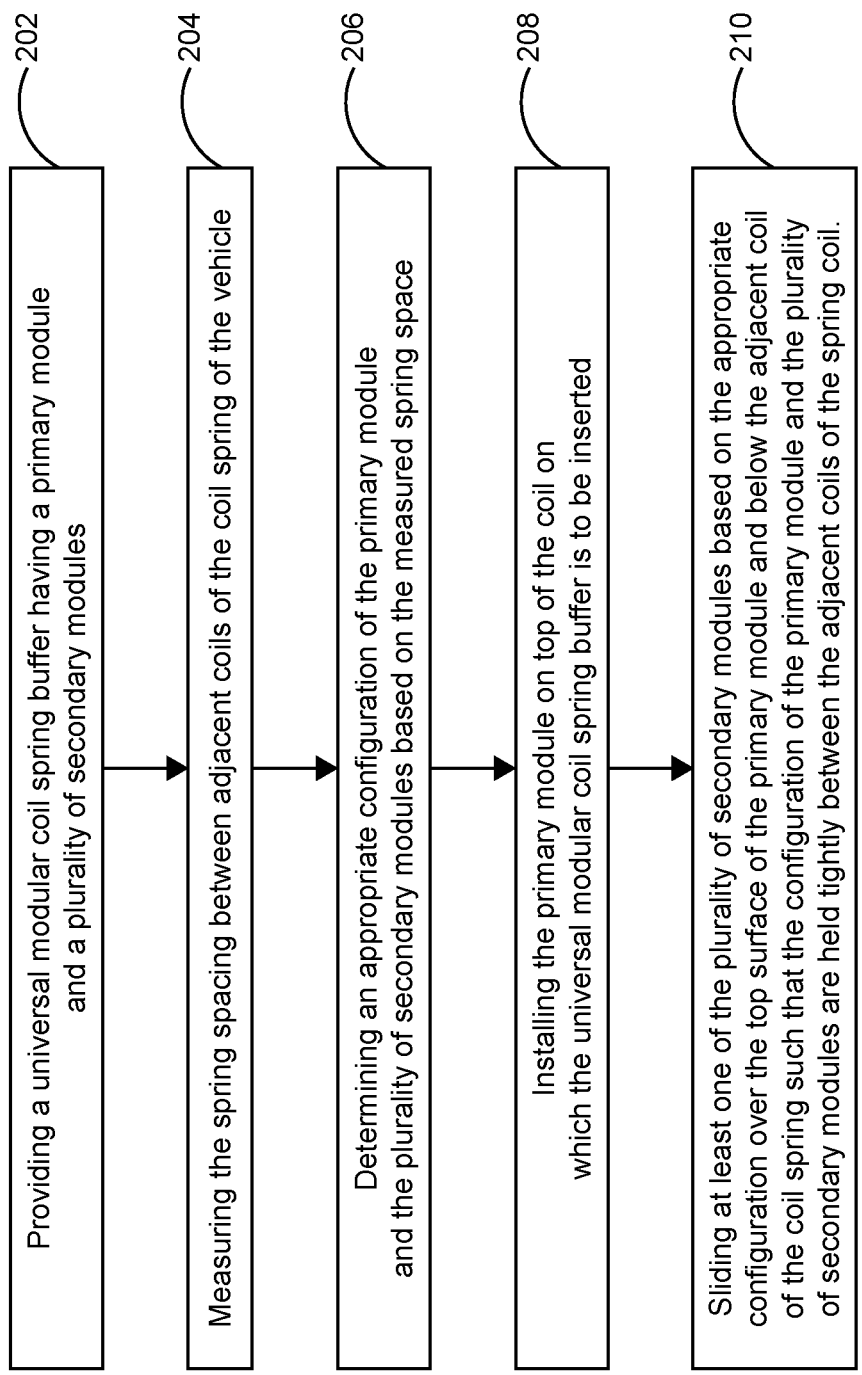
FIG. 10 illustrates a flowchart of a method for installing the universal modular coil spring buffer between the adjacent coils of the coil spring of the vehicle in accordance with the preferred embodiment of the present invention.

FIG. 10 shows a flowchart of a method for installing the universal modular coil spring buffer between the adjacent coils of a coil spring of a vehicle. The method commences by providing a universal modular coil spring buffer having a primary module and a plurality of secondary modules as shown in block 202. Next, measuring the spring spacing between adjacent coils of the coil spring of the vehicle as indicated at block 204. Thereafter, determining an appropriate configuration of the primary module and the plurality of secondary modules based on the measured spring space as shown in block 206. Next, installing the primary module on top of the coil on which the universal modular coil spring buffer is to be inserted as shown in block 208 and finally, sliding at least one of the plurality of secondary modules based on the appropriate configuration over the bottom surface of the primary module and below the adjacent coil of the coil spring such that the configuration of the primary module and the plurality of secondary modules are held tightly between the adjacent coils of the spring coil as indicated at block 210.

In the preferred embodiment, the different configurations of primary module 100 and plurality of secondary modules 108 can be employed for different vehicles with different coil spring dimensions and based on the distance between the adjacent coils. Also, the structure of the primary module 100 and the plurality of secondary modules 108 are designed to allow the modules to be connected by sliding the matching pieces which lock into place and thereby preventing the modules from moving while the vehicle is in motion. Fasteners like zip ties may be used to connect the primary module 100 and the plurality of secondary modules 108 firmly together on top of the coil spring to prevent the shocks, prolong vehicle suspension, increase driving stability, and improve longevity of vehicle shocks.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention to not be limited by this detailed description, but by the claims and the equivalents to the claims appended hereto.

What is claimed is:

1. A universal modular coil spring buffer comprising:
   a plurality of modules arranged in a specific configuration adaptable to be inserted in the gap of a coil spring of a vehicle to prevent shocks, the plurality of modules includes a primary module and a plurality of secondary modules;
   wherein the primary module includes at least one elongated groove configured to fix and hold adjacent coils of the coil spring of the vehicle;

wherein each of the secondary modules have an secondary inner surface, a secondary outer surface, a secondary top surface, and a secondary bottom surface, and each of the secondary modules include an elongated slot on the secondary bottom surfaces and an elongated projection on the secondary top surfaces;

wherein the elongated projections on the secondary top surfaces of each of the plurality of secondary modules is adaptable to fix with the at least one elongated groove of the primary module thereby allowing customization of the universal modular coil spring buffer in different vehicles having different coil spring space;

wherein at least one elongated projection on at least one secondary top surface of at least one of the plurality of secondary modules fixes with the at least one elongated groove on a bottom surface of the primary module;

whereby different configurations of the primary module and the plurality of secondary modules can be employed for different vehicles with different coil spring dimensions and based on the distance between the adjacent coils.

2. The universal modular coil spring buffer of claim 1 wherein the primary module is substantially semicircular in shape having an inner surface, an outer surface, a top surface and a bottom surface.

3. The universal modular coil spring buffer of claim 2 wherein the top surface and the bottom surface of the primary module includes the elongated groove configured to fix and hold the adjacent coils of the coil spring of the vehicle.

4. The universal modular coil spring buffer of claim 2 wherein the primary module can be positioned between the adjacent coils of the coil spring such that elongated grooves snugly hold there between and minimizes the shock in the coil spring when the vehicle hits a bump on the road.

5. The universal modular coil spring buffer of claim 1 wherein the plurality of secondary modules includes a first module, a second module and a third module.

6. The universal modular coil spring buffer of claim 1 wherein each of the plurality of secondary modules is substantially semicircular shape.

7. The universal modular coil spring buffer of claim 1 wherein the length and breadth of the primary module and the plurality of secondary modules are the same, whereas the height of the primary module and each of the plurality of secondary modules are different.

8. The universal modular coil spring buffer of claim 1 wherein the elongated groove on a top surface of the primary module and an elongated slot on a secondary bottom surface of a secondary module holds the adjacent coils of the coil spring of the vehicle.

9. The universal modular coil spring buffer of claim 1 wherein the different configurations of primary module and plurality of secondary modules can be employed for different vehicles with different coil spring dimensions and based on the distance between the adjacent coils.

10. The universal modular coil spring buffer of claim 1 wherein the structure of the primary module and the plurality of secondary modules are designed to allow the modules to be connected by sliding the matching pieces which lock into place and thereby preventing the modules from moving while the vehicle is in motion.

11. The universal modular coil spring buffer of claim 1 wherein the buffer lessens the compression to the coil spring thereby minimizing oil to leak caused from shocks of the vehicle.

12. A universal modular coil spring buffer comprising:
a primary module having an inner surface, an outer surface, a top surface and a bottom surface, the top surface and the bottom surface of the primary module includes an elongated groove configured to fix and hold adjacent coils of a coil spring of a vehicle;

a plurality of secondary modules each having a first module, a second module and a third module, each of the plurality of secondary modules is substantially semicircular in shape and having a secondary inner surface, a secondary outer surface, a secondary top surface and a secondary bottom surface, and each secondary top surface having an elongated projection;

wherein the elongated projections on secondary top surfaces of each of the plurality of secondary modules are adaptable to fix with the elongated groove on the bottom surface of the primary module thereby allowing customization of the universal modular coil spring buffer in different vehicles having different coil spring space;

wherein an elongated projection on the secondary top surface of one of the plurality of secondary modules fixes with the elongated groove on the bottom surface of the primary module;

whereby the different configurations of primary module and plurality of secondary modules can be employed for different vehicles with different coil spring dimensions and based on the distance between the adjacent coils.

13. The universal modular coil spring buffer of claim 12 wherein the primary module can be positioned between the adjacent coils of the coil spring such that the elongated grooves snugly hold there between and minimizes the shock in the coil spring when the vehicle hits a bump on the road.

14. The universal modular coil spring buffer of claim 12 wherein the length and breadth of the primary module and the plurality of secondary modules are the same, but the height of the primary module and each of the plurality of secondary modules are different.

15. The universal modular coil spring buffer of claim 12 wherein the elongated groove on the top surface of the primary module and an elongated slot on a secondary bottom surface of a secondary module holds the adjacent coils of the coil spring of the vehicle.

16. The universal modular coil spring buffer of claim 12 wherein the structure of the primary module and the plurality of secondary modules are designed to allow the modules to be connected by sliding the matching pieces which lock into place and thereby preventing the modules from moving while the vehicle is in motion.

17. The universal modular coil spring buffer of claim 12 the buffer lessens the compression to the coil spring which thereby minimizing oil to leak caused from shocks of the vehicle.

18. A method for installing a universal modular coil spring buffer between adjacent coils of a coil spring of a vehicle comprises the steps of:
a. providing the universal modular coil spring buffer having a primary module with an elongated groove on a bottom surface of the primary module, and a plurality of secondary modules with an elongated projection on a secondary top surface of each of the plurality of secondary surfaces adaptable to fix with the elongated groove of the primary module;
b. measuring the spring spacing between adjacent coils of the coil spring of the vehicle;

c. determining an appropriate configuration of the primary module and the plurality of secondary modules based on the measured spring space;
d. installing the primary module to the top coil between which the universal modular coil spring buffer is to be inserted; and
e. joining at least one of the plurality of secondary modules based on the appropriate configuration under the bottom surface of the primary module and to the adjacent coil of the coil spring such that the configuration of the primary module and the plurality of secondary modules are held tightly between the adjacent coils of the spring coil.

\* \* \* \* \*